United States Patent [19]

Terblanche

[11] Patent Number: 5,630,944
[45] Date of Patent: May 20, 1997

[54] TREATMENT OF SEWAGE SLUDGE

[76] Inventor: Johannes S. Terblanche, 18 Suikerbos Crescent, Plattekloof, South Africa

[21] Appl. No.: 371,725

[22] Filed: Jan. 12, 1995

Related U.S. Application Data

[63] Continuation-in-part of Ser. No. 75,076, Jun. 10, 1993, abandoned.

[30] Foreign Application Priority Data

| Jun. 10, 1992 | [ZA] | South Africa | 92/4240 |
| Sep. 1, 1992 | [ZA] | South Africa | 92/6615 |
| Dec. 22, 1992 | [ZA] | South Africa | 92/9965 |

[51] Int. Cl.[6] ................................................. C02F 11/00
[52] U.S. Cl. .................... 210/768; 210/205; 366/297; 366/298; 366/300; 366/306; 366/318; 366/321
[58] Field of Search ........................... 210/768, 205; 366/318, 297, 298, 300, 306, 321

[56] References Cited

U.S. PATENT DOCUMENTS

| 1,134,220 | 4/1915 | Nash | 366/298 |
| 3,090,605 | 5/1963 | Copeland et al. | 366/298 |
| 3,421,740 | 1/1969 | Behrens | 366/298 |
| 3,638,920 | 2/1972 | Davis | 366/298 |
| 3,706,442 | 12/1972 | Peat | . |
| 3,797,807 | 3/1974 | Behrens | 366/298 |
| 3,873,070 | 3/1975 | Beken et al. | 366/298 |
| 3,942,768 | 3/1976 | Hughes | 366/297 |
| 4,712,922 | 12/1987 | Feterl | 366/297 |
| 5,005,980 | 4/1991 | Zimmerman | 366/297 |
| 5,186,840 | 2/1993 | Christy et al. | 366/297 |
| 5,230,562 | 7/1993 | Nishimi et al. | 366/298 |

*Primary Examiner*—Neil McCarthy
*Attorney, Agent, or Firm*—Sprung Horn Kramer & Woods

[57] ABSTRACT

Sewage sludge is mixed with organic material such as woodchips in a three screw mixer so that moving masses are created in the mixing compartment, there being a shearing action at the interfaces between the masses. The mixer includes the mixing compartment and a holding compartment into which dewatered sludge is continuously charged. There is a gate between the compartments which is opened when it is desired to convey sludge from the holding compartment to the mixing compartment. The shearing action results in the organic material being coated with a thin layer of sludge without the formation of dewatered sludge lumps which would rot instead of composting.

9 Claims, 4 Drawing Sheets

5,630,944

TREATMENT OF SEWAGE SLUDGE

This application is a continuation-in-part of application Ser. No. 08/075,076, filed Jun. 10, 1993, now abandoned.

FIELD OF THE INVENTION

THIS INVENTION relates to the treatment of sewage sludge.

BACKGROUND TO THE INVENTION

Modern sewage works produce vast quantities of sewage sludge. Once dewatered, the sludge must be disposed of and this is usually done by dumping the sludge in the sea or in a landfill.

Whilst dewatered sludge is known to have soil improving properties, it cannot be used for this purpose without further treatment as it contains pathogens. These can be removed by heat and it is known to compost the dewatered sludge before it is dug into the soil or used for other agricultural purposes, for example, as a growing medium.

It has been proposed in the art that the dewatered sludge be mixed with an organic material such as straw, bark, wood chips, leaves etc before being composted. The function of the solid material is to create air voids in what would otherwise be an air impervious mass of dewatered sludge. A mass of sludge that air cannot enter does not compost but rots, obnoxious odours being emitted by the rotting sludge.

Whilst the beneficial properties of composted sludge are known, and there have been many proposals as to how the dewatered sludge should be treated before being composted, it is a fact that only a small percentage of sewage sludge is used for agricultural purposes.

Experimental work has shown that a characteristic of dewatered sludge is its ability to agglomerate into lumps. If dewatered sludge and a product such as wood chips are mixed by hand, for example, by using spades to turn a pile of sludge and wood chips, lumps readily form. As air can only penetrate about 1.5 mm into dewatered sludge, it will be understood that even small lumps will only be aerobic on the surface. The centre consequently rots during composing. Consequently, whilst it is known that the mixing procedure should avoid lump formation, in practice it is found that with known mixing methods, lump formation is inevitable.

OBJECTS OF THE INVENTION

The main object of the present invention is to provide a method of mixing dewatered sewage sludge and an organic material which method avoids the formation of lumps of sewage sludge.

A further object of the present invention is to provide a method of mixing dewatered sewage sludge and organic material in such manner that the organic material is coated with a layer of dewatered sludge.

Yet another object of the present invention is to provide mixing apparatus which avoids the formation of lumps of dewatered sewage sludge whilst coating organic material with a layer of dewatered sludge.

BRIEF SUMMARY OF THE INVENTION

According to one aspect of the present invention there is provided a method of mixing dewatered sewage sludge with an organic material which comprises charging said sludge and said organic material into a mixer, feeding a first mass of sludge and organic material at a first velocity and feeding a second mass of sludge and organic material at a second velocity, there being an interface between the relatively moving masses at which interface there is a shearing action between the two masses.

According to a further aspect of the present invention there is provided a mixer for mixing dewatered sewage sludge with an organic material which mixer comprises a casing defining an elongate mixing compartment, a first screw for displacing a first mass of sewage sludge and organic material at a first velocity along said compartment, a second screw for displacing a second mass of sewage sludge and organic material at a second velocity along said casing so that here is an interface between the two masses at which a shearing action takes place, a holding compartment for receiving dewatered sludge, and a gate having a closed position in which it prevents sludge in the holding compartment from reaching the mixing compartment and an open position in which it permits movement of dewatered sludge from the holding compartment to the mixing compartment.

Said first and second screws can move said masses in opposite directions in said compartment.

In a preferred form said mixer includes a third screw, said first and second screws moving said first and second masses in the same direction but at different speeds and the third screw moving a third mass in the opposite direction to the first and second masses whereby there are interfaces between the first and second masses, between the second and third masses and between the first and third masses at all of which interfaces a shearing action takes place.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
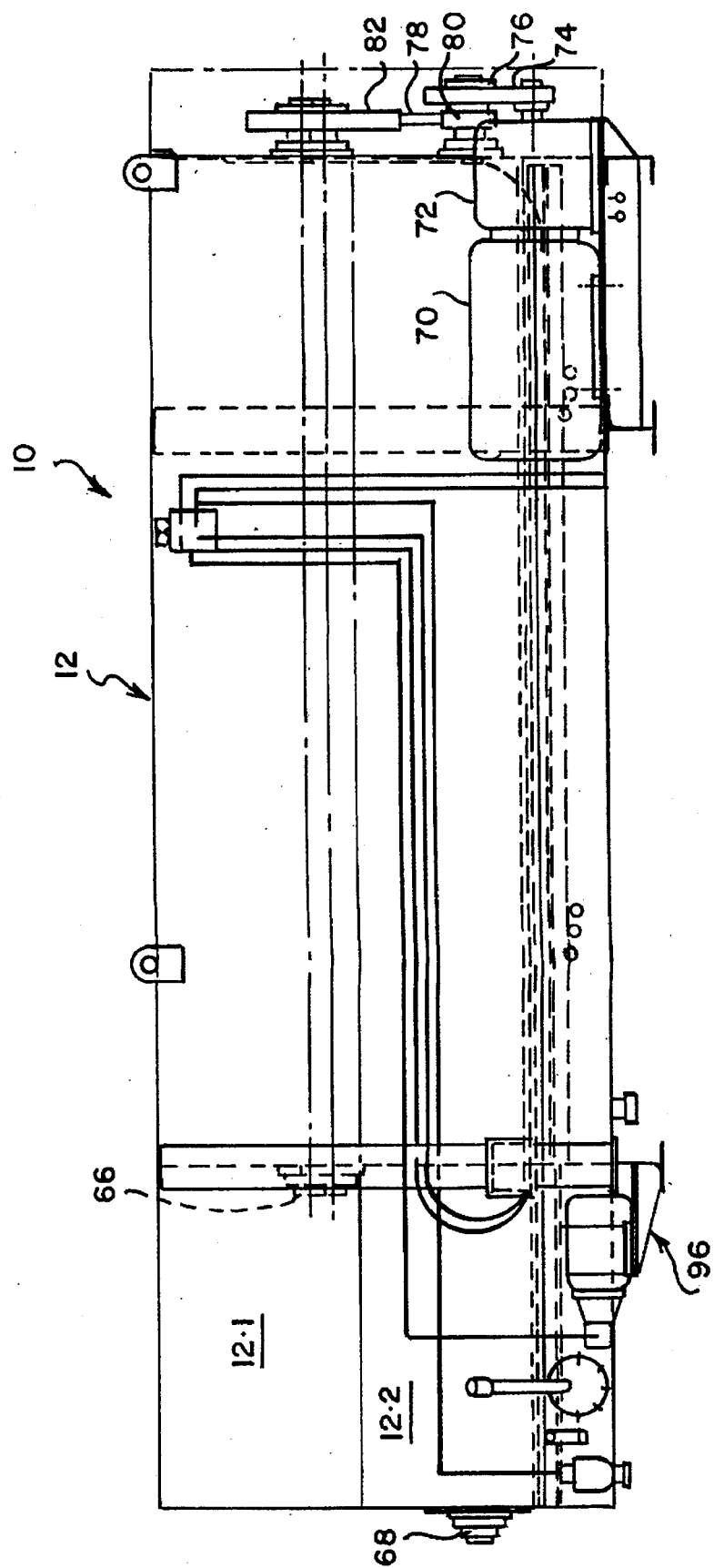
FIG. 1 is a side elevation of apparatus in accordance with the present invention.

The apparatus illustrated in FIGS. 1 to 6 of the drawings comprises a horizontally elongate casing 10 having side walls 12 and end walls 14. The side walls 12 have vertical upper parts 12.1 and inclined lower-parts 12.2 (see particularly FIGS. 3, 4 and 5), the lower parts 12.2 forming a funnel. Below the funnel there is a downwardly open trough bounded by side plates 16.

The elongate gap between the lower edges of the wall parts 12.2 is closed by an elongate plate 18 (see particularly FIG. 5) the upper surface of which is concave. Two flanges 20 extend downward from the plate 18 into the trough between the side plates 16. The plate 18 extends the full length of the casing between the end walls 14.

Figure 2:
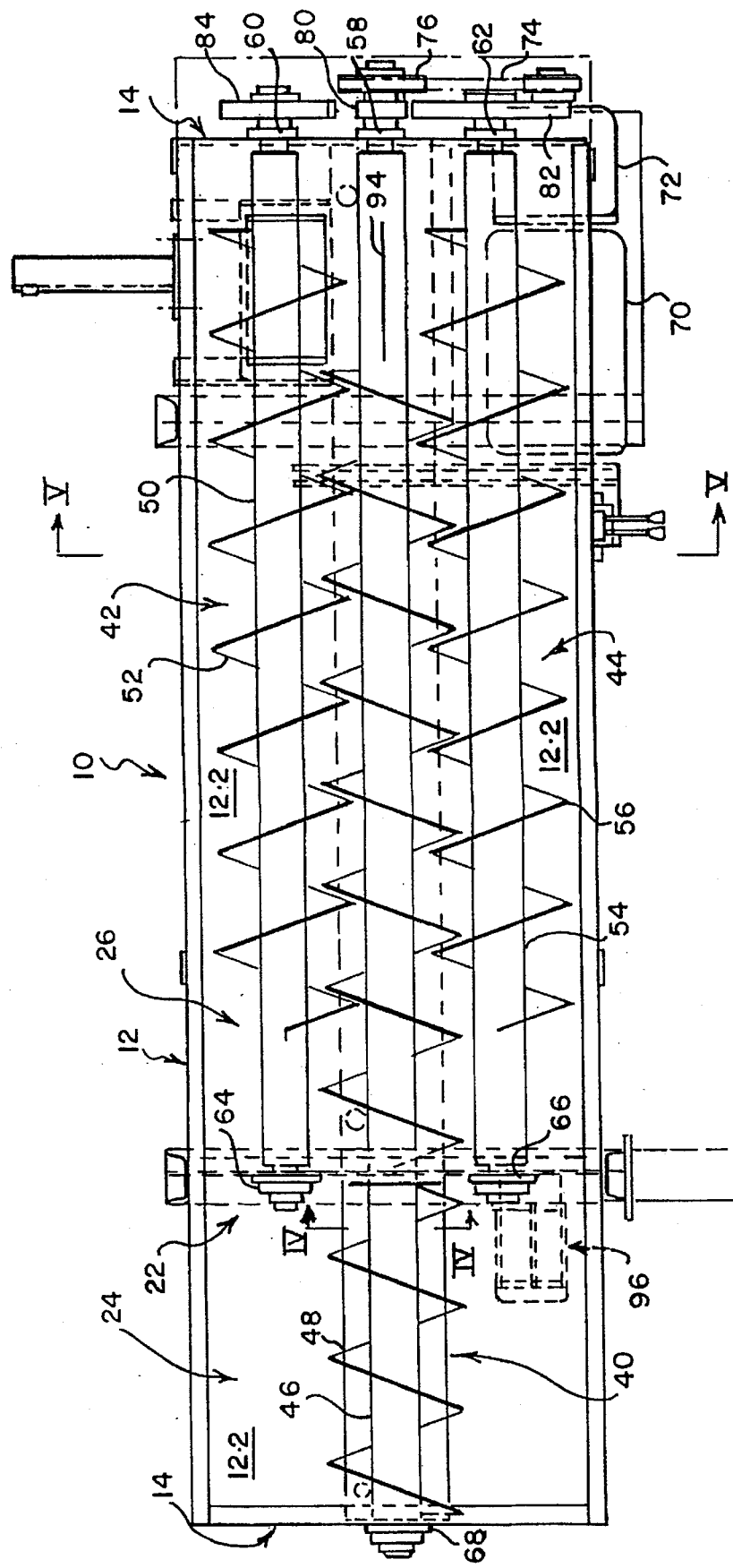
FIG. 2 is a top plan view of the apparatus of FIG. 1.
Figure 3:
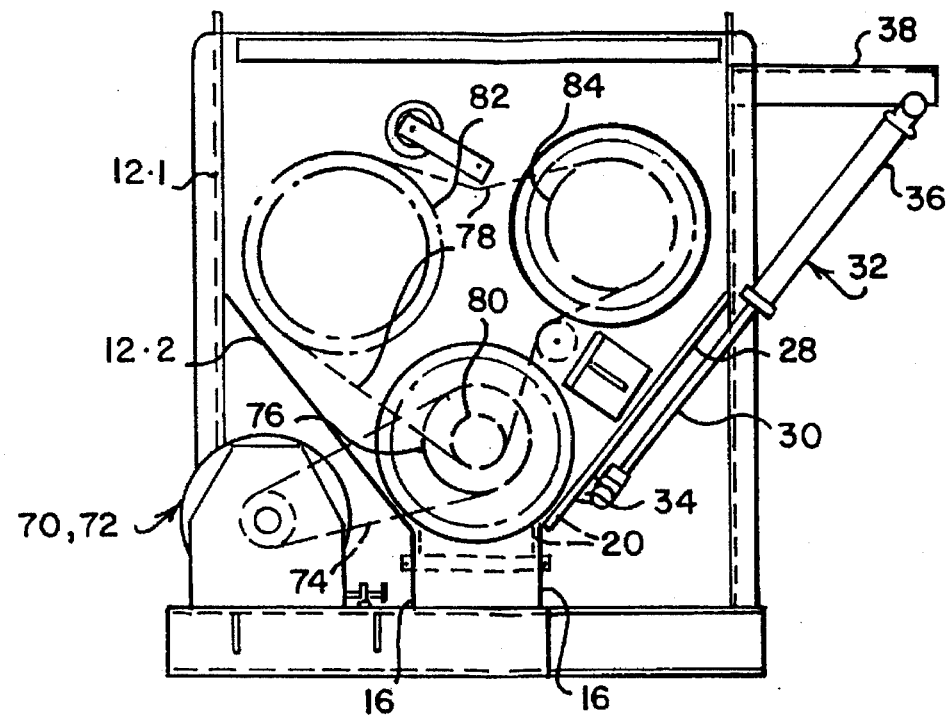
FIG. 3 is an elevation illustrating one end of the apparatus.

Within the casing 10 there is an internal partition designated 22, this dividing the casing into a smaller holding compartment 24 and a larger mixing compartment 26 (see particularly FIG. 2).

An inclined door 28 (FIG. 3) is provided for closing-off, whilst in the illustrated position, a discharge opening provided in the lower wall part 12.2 of the larger compartment 26. The inclined edges of the door are in guides and the rod 30 of an hydraulic cylinder 32 is attached to a lug 34 protruding from the underside of the door 28. The body 36 of the hydraulic cylinder is attached to a beam 38.

Three feed screws 40, 42 and 44 are provided within the casing 10. The screw 40 comprises a central shaft 46 and a helical flight 48. The screw 42 comprises a central shaft 50 and a helical flight 52, and the screw 44 comprises a shaft 54 and a helical flight 56. The flights 52 and 56 are of the same hand and the flight 48 is of the opposite hand.

The upper screws 42 and 44 rotate in the same direction as one another and are at slightly different heights. The screw 40 rotates in the same direction as the screws 42 and 44 and is below the screws 42 and 44. Each screw 40, 42 and 44 is mounted in bearings 58, 60 and 62 respectively carried by the right hand end wall 14 as shown in FIG. 2. The left hand ends of the screws 42 and 44 are mounted in bearings 64, 66 carried by the partition 22. The screw 40 passes beneath the partition 22 and its shaft 46 is mounted in a bearing 68 carried by the other end wall 14 ie by the left hand end wall 14 as viewed in FIG. 2.

The drive for the screws 40, 42 and 44 comprises an electric motor 70 and a gear box 72. The gear box 72 drives a chain 74 which is entrained around a chain wheel 76 which is fast with the shaft 46 of the screw 40. A further chain 78 is entrained around a second chain wheel 80 co-axial with the wheel 76 and around two further wheels 82 and 84 fast with the shafts 50 and 54 respectively. The wheel 84 is of smaller diameter than the wheel 82.

Figure 4:
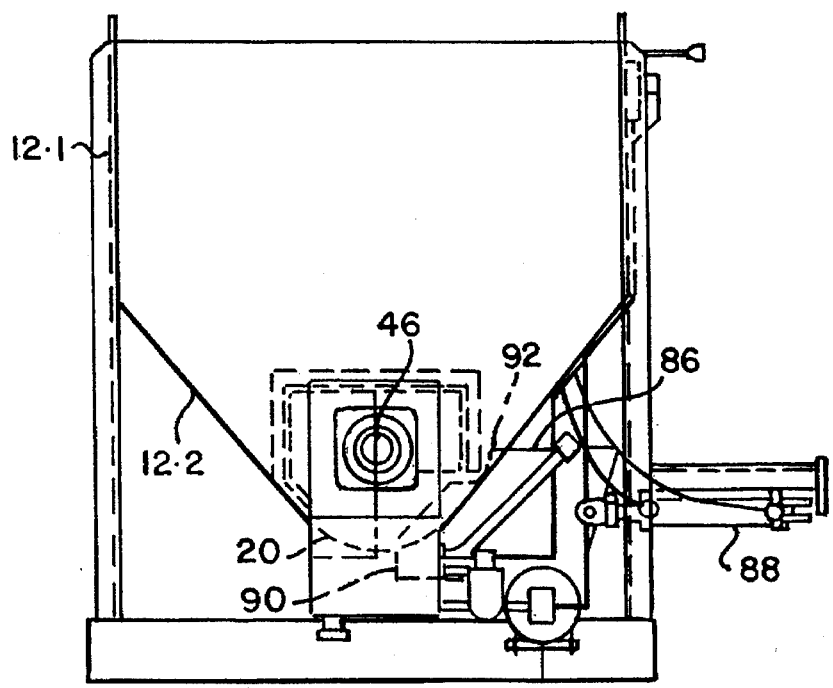
FIG. 4 is an elevation illustrating the other end of the apparatus.

Turning now to FIG. 4, reference numeral 86 designates a slide plate which forms a downward extension of the partition 22 and passes through a slot in the wall 12. Reference numeral 88 designates a hydraulic cylinder which is arranged outside the casing 10 and has its rod attached to that part of the slide plate 86 which is outside the casing 10. The purpose of the cylinder 88 is to move the plate 86 from the retracted position illustrated to an advanced position in which the leading edge 90 abuts the opposite side plate 16 and the arcuate cut-out 92 fits snugly around the shaft 46. The plate 86 effectively closes-off the compartment 24 from the compartment 26 when in its advanced position. The flight 48 has a gap in it in the region of the partition 22 and the plate 86 fits in this gap. There is additionally a disc (not shown) on the shaft 46 close to the partition 22.

Figure 5:
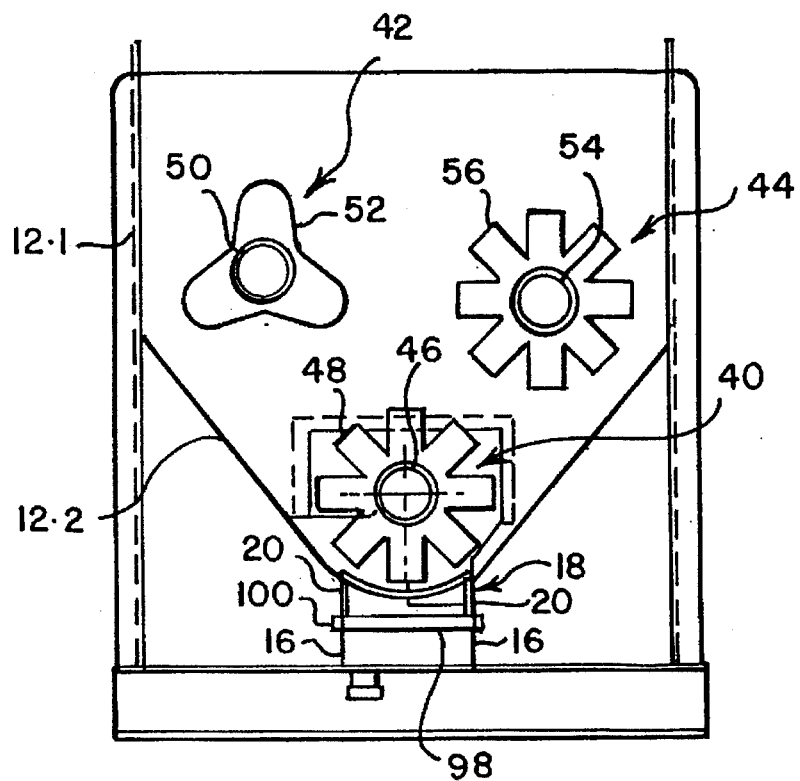
FIG. 5 is a section on the line V—V of FIG. 2.
Figure 6:
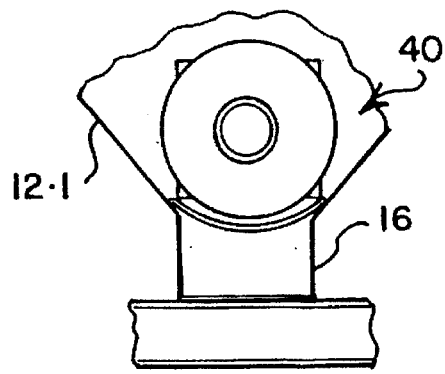
FIG. 6 is a section on the line VI—VI of FIG. 2.

As best seen in FIG. 5, the flights 48 and 56 are different to the flight 52. More specifically the flights 48 and 56 each have eight triangular notches per turn in the peripheral edges thereof. The flight 52 on the other hand has three notches per turn and each notch is of a much greater included angle. Furthermore there are no sharp directional changes on the edge of the flight 52 which as a result is wave-like in configuration. Whilst the flights 48 and 56 are shown as being the same, it is possible for the notches of the flight 48 to have flat bottoms ie to be of truncated V-form. The screw 40 rotates more slowly than the screws 42 and 44 and the screw 42 rotates more slowly than the screw 44.

The differences in shaft speeds and the differing natures of the flights ensure that thorough mixing takes place. The gaps in the flights permit material to pass through the flights so that the flights not only move the material but cause mixing to occur along the flights.

The result is that within in the compartment 26 the relatively liquid sludge is smeared over the surfaces of the wood chips or the like in a very short period of time.

As best seen in FIG. 2, the flight 48 terminates short of the right hand end wall 14. On the part of the shaft 46 between the end wall 14 and the end of the flight 48 are a number of diametrically opposed, radially protruding lifting blades 94. Two of these blades are adjacent the door 28 and others are beyond the door. Similar blades can be provided on the shaft 46 adjacent the partition 22 and at each end of each shaft 50 and 54 so that lifting and tumbling of the material occurs at each end of the larger compartment 26.

The pump and motor for the hydraulic system which operates the door 28 and slide plate 86 are shown at 96 in FIGS. 1 and 2.

The effectiveness of the screw 40 in mixing the contents of the compartment 26 depends partly on the gap between the flight 48 and the plate 18. As best seen in FIG. 5, the lower edge of the flanges 20 rest on sleeves 98 which span between the side plates 16. Pins 100 pass through the sleeves and through holes in the plates 16. Once the pins 100 have been removed, the sleeves 90 can be displaced vertically and the pins then inserted through other holes thereby adjusting the position of the plate 18 and hence the width of the gap between the flight 48 and the plate 18.

The mixer operates on an intermittent basis. Whilst sludge and one or more other materials eg wood chips, wood shavings, straw etc are being mixed in the mixing compartment 26 to the right of the partition 22 by all three screws 40, 42 and 44, the holding compartment 24 to the left of the partition 22 is being filled with sludge. The slide plate 86 is at this time in its advanced position so that the compartments 24 and 26 are almost entirely isolated from one another. Thus whilst some stirring of the sludge occurs due to the action of the part of the flight 48 of the screw 40 to the left of the gap in the flight (as viewed in FIG. 2), no significant amount of sludge is fed under the partition 22 to the right hand compartment 26.

Once mixing in the right hand compartment 26 has been completed, the door 28 is opened and the blades 94 of the screw 40 lift the mixed material Out onto a conveyor belt (not shown) which carries it away. Once the compartment 26 is empty the door 28 is closed. Further wood, straw etc is then fed into the compartment 26 and the slide plate 86 is withdrawn by the cylinder 88 so that a new charge of sludge is fed into the compartment 26 from the compartment 24 by the screw 40. Once there is sufficient sludge in the compartment 26, the slide plate 96 is returned to its advanced position in which the compartments are again isolated from one another. Sludge feeds continuously into the compartment 24 from the sludge dewatering apparatus.

In the compartment 26 mixing of the sludge fed under the partition 22 with the material fed into the top of the compartment 26 takes place as well as some cutting of the material. The screws 42 and 44 displace the material at different speeds towards the partition 22. There is thus a shearing action along the centre line of the casing 10 between the faster moving material being propelled by the screw 44 and the material being moved more slowly by the screw 42. As the mixed material moved by the screws 42 and 44 reaches the partition 22, it tends to be forced downwards onto the screw 40. Its direction of movement then reverses and it feeds back along the casing. These is also a shearing action between the material moving in the upper part of the casing towards the partition 22 and the material moving in the opposite direction in the lower part of the casing. Between the plate 18 and the screw 40 chopping and mixing of the material takes place. The chopping and mixing action can be altered by raising or lowering the plate 18 as described thereby to vary the gap between the concave top face of the plate 18 and the underside of the screw 40.

Mixing continues until there are no lumps of sewage sludge in the compartment 26. The ideal mixture is one in which all the sludge is coated onto the vegetable matter which was fed into the compartment 26. The preferred vegetable matter is wood chips but straw, leaves, husks and any other vegetable material left over from farming or forestry can also be used. Shredded paper, cardboard or milled household vegetable refuse can be used. The coating should be from about 0.1 to 1.0 mm thick for the best results.

I claim:

1. A method of mixing dewatered sewage sludge with an organic material thereby smearing said sludge over said organic material so as to form a coating thereon, which method comprises charging said sludge and said organic material into a mixer, feeding a first mass of sludge and organic material at a first velocity and feeding a second mass of sludge and organic material in the same direction as the first mass of sludge and organic material but at a second velocity, there being an interface between the first and second masses at which interface there is a shearing action between the two masses, feeding a third mass of sludge and organic material in the opposite direction to the first and second masses thereby creating interfaces between the second and third masses and between the first and third masses at which interfaces a shearing action takes place.

2. A method as claimed in claim 1, wherein said first and second masses are displaced side-by-side and at substantially the same level as one another, and said third mass is displaced at a level below said first and second masses.

3. A method as claimed in claim 1 wherein said mixer comprises a holding chamber and a mixing chamber and including charging dewatered sludge into said holding chamber from sludge dewatering apparatus whilst simultaneously mixing dewatered sludge and organic material in said mixing chamber, discharging mixed dewatered sludge and organic material from said mixing chamber, opening a gate separating said holding chamber from said mixing chamber, conveying dewatered sludge from the holding chamber to the mixing chamber and charging said mixing chamber with further organic material.

4. A means for mixing dewatered sewage sludge with an organic material comprising a mixer and a source of dewatered sewage sludge and a source of an organic material, said mixer comprising a casing defining an elongate mixing compartment, a first screw for displacing a first mass of sewage sludge and organic material along said compartment at a first velocity, a second screw for displacing a second mass of sewage sludge and organic material along said compartment at a second velocity different than said first velocity so that there is an interface between the first and second masses at which a shearing action takes place, a third screw, for moving a third mass of sewage sludge and organic material along said compartment, wherein said first and second masses are moved in the same direction and said third mass is moved in the opposite direction to the first and second masses whereby there is an interface between said second and third masses and between the first and third masses at which interfaces a shearing action takes place, a holding compartment for receiving dewatered sludge, and a gate having a closed position in which it prevents sludge in the holding compartment from reaching the mixing compartment and an open position in which it permits movement of dewatered sludge from the holding compartment to the mixing compartment.

5. A mixer as claimed in claim 4, and including a first end wall, a second end wall and an internal partition, the mixing compartment being between said first end wall and said partition and the holding compartment being between said second end wall and said partition, said first and second screws being mounted on said first end wall and said partition, and said third screw passing through said partition and being mounted on said end walls, said third screw forming means for conveying dewatered sludge from said holding compartment to said mixing compartment.

6. A mixer as claimed in claim 4 and including a discharge opening in said casing, a door having a first position in which it closes said opening and a second position in which said discharge opening is open, and lifting blades for lifting mixed sludge and organic material through said discharge opening when the door is in its second position.

7. A method as claimed in claim 1, wherein the organic material comprises at least one member selected from the group consisting of straw, bark, wood chips and leaves.

8. The mixer of claim 4 wherein said third screw is below the first and second screws.

9. The mixer of claim 4 further comprising a base plate below said third screw, and means for enabling the base plate to be moved with respect to the third screw to vary a gap between the third screw and the base plate.

* * * * *